Jan. 8, 1929.
W. WAGNER
1,698,079
FILTER CONSTRUCTION
Filed Jan. 5, 1925
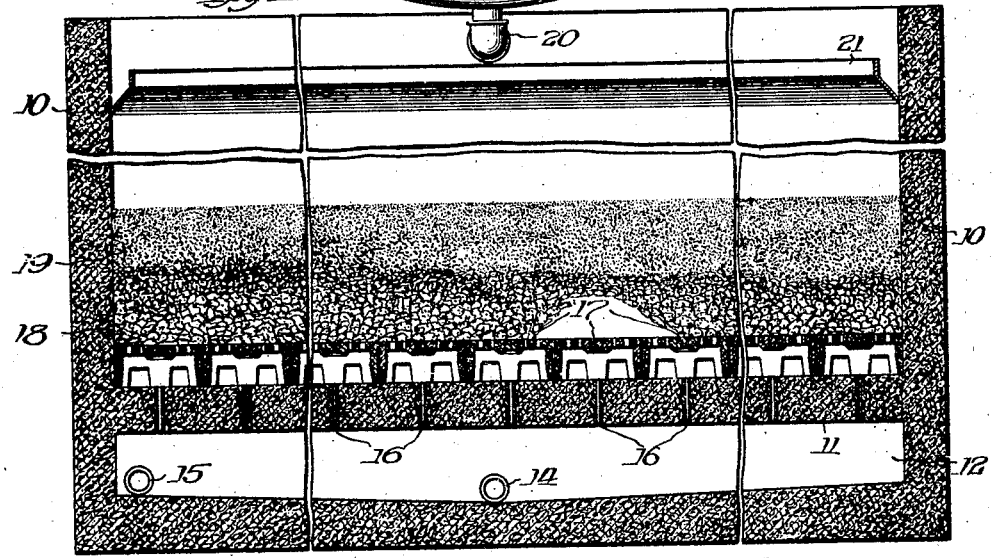
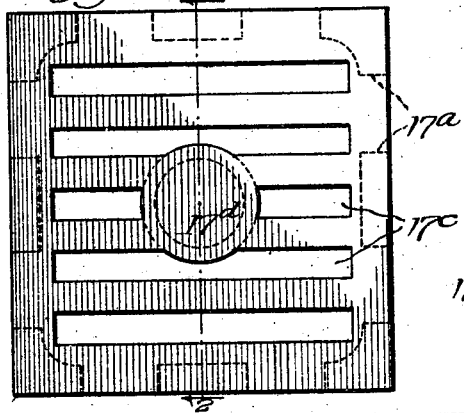
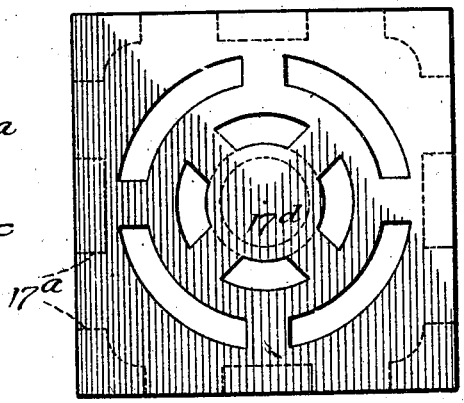
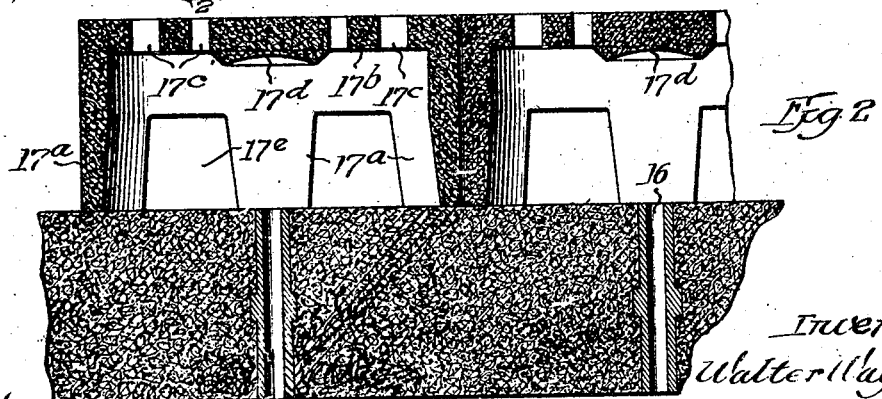
Inventor
Walter Wagner Patented Jan. 8, 1929.

1,698,079

UNITED STATES PATENT OFFICE.

WALTER WAGNER, OF BERWYN, ILLINOIS, ASSIGNOR, BY MESNE ASSIGNMENTS, TO GENERAL ZEOLITE COMPANY, OF CHICAGO, ILLINOIS, A CORPORATION OF ILLINOIS.

FILTER CONSTRUCTION.

Application filed January 5, 1925. Serial No. 466.

This invention relates to improvements in the construction of filters of the so-called industrial or municipal type as distinguished from the domestic or household type. As is well known, such filters are designed for large capacity and rapid action and are characterized by the employment of filter beds of sand. Customarily these beds are supported on an underlying foundation of gravel which rests on the floor of the tank or filter basin. Outlets for the effluent are arranged in or below the gravel bed, the latter being depended upon to prevent the sands escaping through the outlets. Such filters require frequent backwashing to free them from the sludge and other material which they have collected from the water. The operation of backwashing customarily is effected by the introduction of clear water below the bed under sufficient pressure to thoroughly churn up the sand and wash out the sludge.

Subsequent proper operation requires that after backwashing, the bed resume its proper position and uniform thickness, and the attainment of this end is dependent upon the uniformity of the gravel foundation stratum.

One of the purposes of the present invention is the provision of a filter construction which will facilitate the backwashing operation by providing a uniform and complete distribution of the backwash water under the filter bed, and prevent displacement of the foundation gravel at points over the backwash inlets.

Another object is the provision of a construction which obviates the necessity for strainers or spray heads on the inlets and outlets below the filter bed and which will prevent clogging of the outlets by material from the filter bed and gravel foundation.

Other and further objects of the invention will be pointed out hereinafter, indicated in the appended claims, or obvious to one skilled in the art upon an understanding of the present disclosure. For the purpose of this application I have elected to illustrate embodiments of the invention in diagrammatic fashion. It is to be understood, however, that the forms of the structure and the particular manner in which the invention is applied are susceptible of great variation. Hence the illustrative disclosure herein is not to be construed in any fashion such as to limit the invention which I purport to secure, short of its true and most comprehensive scope in the art.

In the drawing forming a part of this specification,

Fig. 1 represents a diagrammatic sectional elevation of a filter embodying a form of the invention;

Fig. 2 is a detail in the nature of a sectional elevation of certain elements of the construction; and Figs. 3 and 4 are plan or top views of distributing supports.

The nature of the invention will best be understood by consideration at once of the illustrative embodiments. Let it be understood that the numerals 10 designate side wall portions of a filter basin or tank which has a bottom 11 forming the support for the filter bed. Below the bottom 11 is a collecting and distributing chamber 12 which is served by an outlet 14 for filtered water, and by an inlet 15 for backwash water. Of course the same conduit may be utilized for the withdrawal of filtered water and the introduction of backwash water. A large number of distributing tubes 16 afford communication between the filter basin and distributing chamber 12. These are distributed over the area of the bottom 11 at substantially equidistant spacing. They constitute outlet passages for the filtered water and inlet passages for the backwash water. In connection with their functioning in the last mentioned particular, it is necessary that they be of relatively small diameter, in order to secure the desired uniformity of distribution of backwash water under the filter bed, as will be pointed out presently. Over the upwardly directed outlets of the tubes 16 are arranged the distributing supports 17. These are rectangular members preferably square and may be made of concrete or other suitable water resisting material of adequate strength. Their proportion and construction bear a definite relationship to the distribution and spacing of the tubes 16. As will be seen in Figs. 2 and 3, they are formed with supporting feet $17^a$ and a top portion $17^b$ affording an impact shield $17^d$ and openings $17^c$. The spacing of the feet is such as to afford intervening side openings $17^e$. The top openings $17^c$ preferably are in the form of slots sufficiently narrow to prevent the passage through them of foundation material of the contemplated size. They may be arranged in a variety of disposals, designed to facilitate the passage of water upwardly and downwardly through them, while maintaining the strength of the member adequate to carry the contemplated weight of bed material and water. The disposal of the side openings 17ᵉ is such as to facilitate passage of water from one of these members to another below the top portion 17ᵇ. The proportions of the top portion are such, with reference to the distribution and spacing of the tubes 16, that when a plurality of the distributing supports are assembled in lateral abutment on the filter floor, they form a support for the gravel foundation 18 and the superimposed sand filter bed 19, and their distributing shields 17ᵈ are positioned over the openings of the distributing tubes 16. The filter is provided with suitable supply inlet 20 for the raw water, and discharge collector 21 for the backwash water.

In the operation of the apparatus, the raw water is introduced into the filter basin from the inlet 20, and passes downwardly through the filter bed, through the foundation bed 18 and through the openings 17ᶜ of the distributing supports, finding egress from the filter basin through tubes 16 to the distributing chamber 12, whence it is withdrawn through the outlet 14. In the backwashing operation, backwash water is introduced through the pipe 15 into the distributing chamber 12. The small diameter of the tubes 16 permits the building up in the chamber 12 of a pressure which is necessarily uniform, so that the discharge through the tubes 16 is equalized over the entire area of the basin. Such equalization is of great importance in accomplishing the desired churning up and flushing of the entire filter bed. Of course, the small diameter of the tubes 16 and the pressure of the backwash water tend to produce forcible jets. These may be of such force that if impinged directly upon the gravel foundation they would tend to displace the gravel and form channels through the foundation which, upon the resettling of the bed sand after backwashing, would permit escape of some of the sand through the foundation rather readily. The interposition of the distributing supports however, with their distributing shields 17ᵈ over the tubes 16, prevents the channeling of the gravel foundation, and effects an equalized distribution of the backwash water over the entire area of the filter floor, due to the freedom of flow through the side openings 17ᵉ. The size and distribution of the top openings 17ᶜ permits free passage of the backwash water upwardly into the gravel foundation, without jetting. Consequently the entire filter bed is subjected to the desired agitation and flushing.

Important improvements in the direction of economy are served by this invention due to the elimination of metal spray and strainer heads and substantial decrease in the amount of gravel required for the foundation bed, due to the entire elimination of channeling by backwashing, as described above. This also contributes to efficiency in operation by shortening the period necessary for the water to pass through the filter foundation.

It will be understood, of course, that the invention is not limited to a construction wherein the tubes 16 are supplied from a chamber underlying the filter bottom, as the art is well informed as to a very great variety of ways in which desired flow connections with such tubes may be arranged.

What I claim is:

1. In a filter, in combination, a filter basin having a flat bottom with distributed vertical flow openings therein, distributing supports resting on the basin bottom in close lateral association with one another, said distributing supports having distributing shields disposed over the flow openings and being provided with top openings accommodating flow of water vertically through them and lateral openings accommodating lateral flow of water from one of them to another at different sides, fragmentary bed material supported by said distributing supports entirely above said lateral openings, and means for supplying water to the distributed vertical flow openings.

2. In a filter, in combination, a flat bottomed basin provided with vertical flow passages, means for supplying backwash water to said flow passages below the basin, distributing supports resting on the basin bottom and having distributing shields positioned over the openings of the flow passages and lateral openings accommodating a distributed flow of water horizontally from respective distributing supports to and from those on all sides thereof, a bed of fragmentary material supported by said distributing supports entirely above said lateral openings, said distributing supports having openings through their tops to accommodate the flow of water through them vertically.

3. Elements for filter construction comprising a plurality of similar bed-supporting members, each having a quadrilateral top portion adapted for lateral contact at its several sides with other such members and having legs depending from the top portion at its several sides, said legs being spaced to afford lateral flow spaces at all sides of the member below its top portion, and the top portion being formed with a distributing shield and vertical flow openings through the top portion on all sides of the distributing shield.

In testimony whereof I have hereunto signed my name.

WALTER WAGNER.